(No Model.)

BEST AVAILABLE COP'

W. M. CALLENDER.

JUNCTION BOX FOR ELECTRICAL CONDUCTORS.

No. 397,221. Patented Feb. 5, 1889.

WITNESSES:

INVENTOR:
William M. Callender,
BY
ATTORNEYS.

UNITED STATES PATENT OFFICE.

WILLIAM M. CALLENDER, OF NEW YORK, N. Y.

JUNCTION-BOX FOR ELECTRICAL CONDUCTORS.

SPECIFICATION forming part of Letters Patent No. 397,221, dated February 5, 1889.

Application filed March 10, 1888. Serial No. 266,802. (No model.)

*To all whom it may concern:*

Be it known that I, WILLIAM M. CALLENDER, a subject of the Queen of Great Britain, residing in the city, county, and State of New York, have invented certain new and useful Improvements in Junction-Boxes for Electric Conductors; and I do hereby declare that the following is a full, clear, and exact description of my invention, such as will enable others skilled in the art to which it appertains to make and use the same.

My invention relates more especially to improvements in junction-boxes or connections for underground cables or conductors forming part of systems of electrical distribution for supplying lights, motors, &c. Such conductors are usually carried in tubes and suitably insulated from each other. I propose to use my junction-boxes in combination with a specific form of conductors or cables which I have invented, and for which I make application for Letters Patent of the United States of an even date herewith, Serial No. 266,801. The tube which incloses my conductor is an inflexible insulating-tube in distinction from the metallic tubes which have been hitherto employed. At the same time my invention may be utilized with perhaps equal advantage in connection with that kind of conductor in which the metallic tube forms the sheath. The objection to metallic sheaths is that they are liable to give rise to short circuits or grounds by reason of the inclosed wires making contact with the sheathing. This danger exists in an especial degree at the junction-boxes, which are necessarily filled with insulating material under circumstances less favorable than those which exist when the tubes themselves are filled. For this reason I make my junction-boxes of insulating material, so as to afford special protection at the point where the greatest danger of trouble exists. Aside from this, however, I have sought to construct my junction-box in such a manner that it will make good moisture-tight joints with the tubes and can be easily opened, so as to render the wires accessible.

Figure 1:
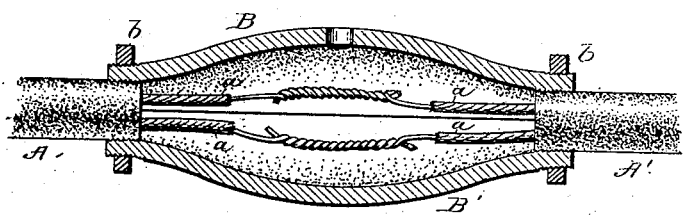
Figure 2:
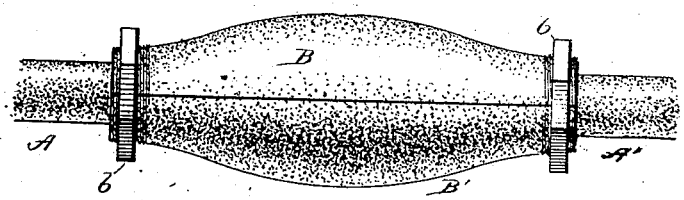

In the drawings which accompany and form a part of this specification, Figure 1 represents a vertical section through my junction-box, showing its connections with the tubes; and Fig. 2 is an elevation of my junction-box.

Similar letters designate the same parts in both figures.

A A' are tubes which inclose insulated electrical conductors. I prefer to make these tubes of indurated fiber or asphaltum, or some good insulating material capable of being wrought into a hard inflexible tube. The wires $a$ $a$ project from the ends of the tubes, and are joined in any suitable manner to the corresponding wires of the adjacent section. I have shown the ends of the wires twisted together; but they may be connected in any other manner preferred.

B is one half of my junction-box, and B' the other. These parts are similar in shape and are screw-threaded internally at their ends, so as to fit over similar threads on the ends of the tubes. The openings at the ends are just large enough to surround the tubes tightly, and when clamped together by the nuts $b$ $b$ they fit closely around the tubes and make moisture-tight joints therewith. The two halves of my junction-box are externally screw-threaded at the ends to receive the nuts. In the part B is a perforation through which insulating material—such as a bituminous compound—can be forced, so as to insulate the inclosed wires.

When it is desired to gain access to the wires at the junction-box, the nuts can be run off and the two halves of my junction-box can be easily pried apart. Moreover, the junction-boxes can be applied just as easily as they can be removed. For example, all that is necessary is to run the nuts over the tubes, then connect the wires, and, after placing the coupling-halves in the position shown, screw on the nuts and the junction is complete.

I prefer to make the junction-boxes of indurated fiber or asphaltum—the same substance which I prefer for the tubes. In any case the boxes must be of some inflexible insulating material, and those mentioned are preferred by reason of their possessing this quality of inflexibility, and being also light and easily handled. With a junction-box of this character there can be no danger of a short circuit or grounding through the box. It will be seen that considerable range is allowed for inserting tubes into the junction-box—that is, they can be thrust in to any desired distance within certain limits.

Having now described my invention, what I claim is—

The combination, with tubes containing insulated electrical conductors, such tubes being threaded at their ends, of internally-threaded junction-boxes fitting around the said ends, the said junction-boxes being made in halves and being provided with means for attachment to the tubes, substantially as set forth.

In witness whereof I have hereunto signed my name in the presence of two subscribing witnesses.

WILLIAM M. CALLENDER.

Witnesses:
 AUGUSTUS MERRITT,
 G. H. STOCKBRIDGE.